United States Patent
Hirano et al.

(10) Patent No.: US 7,361,948 B2
(45) Date of Patent: Apr. 22, 2008

(54) FILTER FUNCTION-EQUIPPED OPTICAL SENSOR AND FLAME SENSOR

(75) Inventors: Akira Hirano, Ikoma (JP); Satoshi Kamiyama, Nagoya (JP); Hiroshi Amano, Nagoya (JP); Isamu Akasaki, Nagoya (JP)

(73) Assignee: UV Craftory Co., Ltd., Aichi (JP)

( * ) Notice: Subject to any disclaimer, the term of this patent is extended or adjusted under 35 U.S.C. 154(b) by 0 days.

(21) Appl. No.: 10/550,824

(22) PCT Filed: Mar. 23, 2004

(86) PCT No.: PCT/JP2004/003993

§ 371 (c)(1),
(2), (4) Date: Jul. 20, 2006

(87) PCT Pub. No.: WO2004/086515

PCT Pub. Date: Oct. 7, 2004

(65) Prior Publication Data

US 2007/0008539 A1    Jan. 11, 2007

(30) Foreign Application Priority Data

Mar. 25, 2003    (JP) .............................. 2003-082589

(51) Int. Cl.
*H01L 31/062* (2006.01)
(52) U.S. Cl. ................................. 257/294; 257/E31.121
(58) Field of Classification Search ............... 438/48, 438/70; 257/294, 431, 444, E31.121, E31.122, 257/E31.123, E33.076, 290, 291; 359/497, 359/581, 591; 356/432
See application file for complete search history.

(56) References Cited

U.S. PATENT DOCUMENTS 5,182,670 A * 1/1993 Khan et al. ................. 359/359

(Continued)

FOREIGN PATENT DOCUMENTS

JP    7-20313    1/1995

(Continued)

OTHER PUBLICATIONS

Hirano et al. (Japan Pub. 2003-057111 "Flame Sensor", Feb. 26, 2006, English Translation).*

*Primary Examiner*—W. David Coleman
*Assistant Examiner*—Khiem D Nguyen
(74) *Attorney, Agent, or Firm*—The Webb Law Firm

(57) ABSTRACT

In order to provide a filter device capable of maintaining stable optical characteristics for an extended period of time and to provide also a photosensor using the filter device, a photosensor having a filter function includes a filter device having a colored glass filter and configured for permitting transmission of light of a predetermined wavelength range including a detection target wavelength range and a light receiving device for receiving the light transmitted through the filter device. The filter device includes a first interference filter structure comprised of a plurality of light transmitting layers stacked on each other, the first interference filter structure being deposited on a face of the colored glass filter. The light receiving device includes a semiconductor photodetector structure having one or more semiconductor layers, a light receiving area being formed in the one or more semiconductor layers within the semiconductor photodetector structure. The one or more semiconductor layers forming the semiconductor photodetector structure contain $In_xAl_yGa_{1-x-y}N$ ($0 \leq x \leq 0.21$, $0 \leq y \leq 1$).

16 Claims, 6 Drawing Sheets

U.S. PATENT DOCUMENTS

| | | | |
|---|---|---|---|
| 6,069,353 A * | 5/2000 | Jung et al. | 250/214.1 |
| 6,194,704 B1 * | 2/2001 | Assadi et al. | 250/214 R |
| 6,406,795 B1 * | 6/2002 | Hwang et al. | 428/457 |
| 6,665,014 B1 * | 12/2003 | Assadi et al. | 348/340 |
| 7,183,598 B2 * | 2/2007 | Fan et al. | 257/288 |

FOREIGN PATENT DOCUMENTS

| | | |
|---|---|---|
| JP | 9-181350 | 7/1997 |
| JP | 11-153483 | 6/1999 |
| JP | 2000-147248 | 5/2000 |
| JP | 2000-183367 | 6/2000 |
| JP | 2002-373977 | 12/2002 |
| JP | 2003-57111 | 2/2003 |

* cited by examiner

FILTER FUNCTION-EQUIPPED OPTICAL SENSOR AND FLAME SENSOR

BACKGROUND OF THE INVENTION

1. Field of the Invention

The present invention relates to a photosensor and a flame sensor including a filter device provided on a light incident face of a light receiving device, the filter device comprising an interference filter structure deposited on a colored glass filter.

2. Description of Related Art

Conventionally, there has been proposed a photosensor made by first preparing a colored glass filter by adding a color coupler (metal or metal compound) to glass and then assembling this colored glass filter with a light receiving device. This photosensor is configured such that light of a predetermined wavelength range is cut off by the colored glass filter and light of a desired wavelength range passing the colored glass filter is detected (see e.g. FIG. 1 of Japanese Patent Application "Kokai" No. 11-153483). For instance, for selectively detecting ultraviolet light contained in sunlight ranging from the ultraviolet range to the infrared range, a photosensor is constructed with a colored glass filter capable of shielding the visible range light and the infrared range light so that the ultraviolet light alone can reach the light receiving device to be detected.

One exemplary application of such photosensor as above is a sensor designed for UV-A (wavelength 315 nm to wavelength 400 nm), UV-B (wavelength 280 nm to wavelength 315 nm) or UV-C (wavelength 100 nm to wavelength 280 nm) as its detection target. And, for each such sensors, there is required wavelength selectivity for detecting only light of a certain wavelength included within each detection target wavelength range. Another exemplary application is an illuminometer designed for determining a light intensity of a light source employed in a photolithography process of a semiconductor exposing apparatus. When an exposure of a photoresist is to be effected using one of a line spectrum such as a g-spectrum (wavelength: 436 nm), h-spectrum (wavelength: 405 nm) and i-spectrum (wavelength: 365 nm) of a mercury lamp, this also requires selective determination of a quantity of light by a target spectrum.

However, in order to obtain better wavelength selectivity in the above-described photosensor, it is necessary to vary very sharply the intensity of light past the filter device at a predetermined wavelength (shielding wavelength) and also to have high sensitivity for the detection target wavelength range as high as 10,000 times or more of sensitivities for non-target wavelength ranges. The colored glass filter is prepared by adding impurity such as a metal or a metal compound to the glass so as to absorb/diffuse the light of a predetermined wavelength included in the incident light. However, as its light transmission characteristics showing the spectra of transmission lights slowly change relative to the wavelength, the light past the filter device still contains light of a wavelength which should be shielded by the filter device. Hence, the above-described sensitivity difference cannot be fully obtained.

In order to solve such problem relating to the wavelength selectivity, it is conceivable to improve the wavelength selectivity of the filter device through deposition thereon of an interference filter structure capable of shielding light of a predetermined wavelength range through utilization of an interference effect, the interference filter being comprised of a plurality of light transmitting layers deposited on the surface of the colored glass filter or on a light receiving face of a light receiving device.

However, since the interference filter structure shields the light of predetermined wavelength range through the light interference function, the wavelength range which can be shielded by the filter device is very narrow. This necessitates a plurality of interference filter structures having mutually differing shielding wavelength ranges to be deposited on the surface of the colored glass filter or on the light receiving face of a light receiving device. However, it has been found that with thick deposition of interference filter structures, there occurs a new problem of cracks therein. Further, the state-of-the art filters designed for selectively transmitting UV-B or UV-C alone suffer poor wavelength selectivity in permitting good transmission of light of a detection target wavelength while effectively shielding lights of non-target wavelengths. For instance, at the present state of the art, the light transmittance values for two wavelengths which are adjacent a target wavelength range and a non-target wavelength range, respectively, have a difference as small as about 1% even in the case of the interference filter. The difference is substantially non-existent in the case of a colored glass filter. For this reason, it has been impossible to detect, with high precision, UV-B or UV-C contained in the sunlight and having a very weak light intensity And, there is another problem that due to emission of line spectra from the mercury lamp other than the desired line spectrum, integrated sensitivities for the longer wavelength side of the light receiving device are inadvertently added to the output of the illuminometer.

In addition, substantially no colored glass filter is presently available which is capable of good transmission of the ultraviolet light. It is only known that a colored glass filter including a base material comprised of boron oxide, aluminum oxide, magnesium oxide, etc. has relatively good transmittance for ultraviolet. However, such colored glass filter having such ultraviolet transmission characteristics and having also effective shielding characteristics for visible range light is not comprised solely of such stable base material as $SiO_2$ or $Al_2O_3$. Therefore, it is known that such colored glass filter suffers the problem of occurrence of undesirable change in its optical characteristics due to environmental influence such as heat or moisture. And, this influence will be even greater when the colored glass filter is employed under such environment of high temperature/high moisture. Especially, if a filter device using the colored glass filter is combined with a light receiving device to construct a photosensor expected to selectively detect light of a predetermined wavelength range alone as described above, such change with time in the optical characteristics of the colored glass filter (namely change in wavelength/intensity of the light incident on the light receiving device) will be a serious problem.

For example, in case the photosensor having the above-described construction is employed as a flame sensor of a type expected to provide selective detection of ultraviolet light, in view of the fact that the light intensity of the flame appearing in a wavelength range (wavelength from about 300 nm to about 280 nm) different from external disturbance light such as sunlight or room light from various lighting equipments, it is necessary to reliably shield such external disturbance light alone by means of a filter device having good wavelength selectivity. In this, as the flame sensor can be significantly affected by heat and/or moisture, with change, if any, in the optical characteristics of the colored glass filter, the light of the flame which should be incident on the light receiving device can be shielded inadvertently by the filter device, or conversely external disturbance light which should be shielded by the filter device can enter inadvertently the light receiving device. As a result, the result of flame light detection by such flame sensor (photosensor) will be unreliable.

The present invention has been made in view of the above-described problems. A primary object of this invention is to provide a photosensor and a flame sensor having a filter device capable of maintaining stable optical characteristics for an extended period of time.

SUMMARY OF THE INVENTION

For accomplishing the above-noted object, according to the first characterizing feature of the present invention, a photosensor having a filter function, comprises:

a filter device having a colored glass filter and configured for permitting transmission of light of a predetermined wavelength range including a detection target wavelength range; and a light receiving device for receiving the light transmitted through the filter device;

wherein said filter device includes a first interference filter structure comprised of a plurality of light transmitting layers stacked on each other, the first interference filter structure being deposited on a face of the colored glass filter;

said light receiving device includes a semiconductor photodetector structure having one or more semiconductor layers, a light receiving area being formed in the one or more semiconductor layers within the semiconductor photodetector structure; and said one or more semiconductor layers forming the semiconductor photodetector structure contain $In_xAl_yGa_{1-x-y}N$ ($0 \leq x \leq 0.21$, $0 \leq y \leq 1$).

Namely, according to this first characterizing feature, the filter device includes a colored glass filter and the first interference filter structure described above and the light receiving device is comprised of a semiconductor photodetector structure having a light receiving area which contains InAlGaN. Hence, there is provided a photosensor constructed such that the light irradiated on the photosensor from the outside will reach the light receiving device with its light components of the longer wavelength range than the detection target wavelength range being effectively shielded by the filter device and the light of other wavelength range than the detection target wavelength range is prevented from reaching the light receiving area of the light receiving device. Further, since InAlGaN is a direct transition type semiconductor, the light absorption spectrum of the light receiving area sharply varies at the absorption end wavelength, so that there is provided a photosensor having good wavelength selectivity.

Moreover, as the first interference filter structure is deposited on at least one face of the colored glass filter as a protective layer for this colored glass filter, performance deterioration in the colored glass filter when exposed to heat and/or moisture can be prevented. Consequently, there is provided a photosensor which has a colored glass filter capable of maintaining its initial optical characteristics for an extended period of time and which therefore can provide stable performance for the extended period of time.

For accomplishing the above-noted object, according to the second characterizing feature of the photosensor having a filter function of the invention, said filter device further includes a second interference filter structure comprised of a plurality of light transmitting layers stacked on each other, the second interference filter structure being deposited on the other face of the colored glass filter opposite to the one face on which said first interference structure is deposited.

Namely, according to this second characterizing feature, the second interference filter structure is deposited on the other face of the colored glass filter opposite to the one face on which said first interference structure is deposited. Hence, most portions of the colored glass filter can be protected by the interference filter structure. As a result, it is possible to provide a photosensor having greater resistance (environmental resistance) against heat, moisture, etc.

For accomplishing the above-noted object, according to the third characterizing feature of the photosensor having a filter function of the invention, said interference filter structure contains at least one of $SiO_2$ and $HfO_2$, with an exposed surface of the interference filter structure being formed of the oxide.

Namely, with this third characterizing feature, the colored glass filter is covered with the interference filter structure containing at least one of $SiO_2$ and $HfO_2$, with an exposed surface of the interference filter structure being formed of the oxide. Hence, the environmental influence of heat, water or the like can be shielded by the interference filter structure, thus preventing its influence to the colored glass filter. As a result, it is possible to provide a photosensor having greater resistance (environmental resistance) against heat, moisture, etc.

For accomplishing the above-noted object, according to the fourth characterizing feature of the photosensor having a filter function of the invention, a longer wavelength end wavelength of said detection target wavelength range corresponding to an absorption end wavelength of said light receiving area is set near a longer wavelength end wavelength of a light transmission wavelength range of said filter device; and a first sensitivity for a predetermined first wavelength included within said detection target wavelength range has a value 10,000 times or more greater than a value of a second sensitivity for a second wavelength which is outside said detection target wavelength range and which is 50 nm longer than said first wavelength.

Namely, according to this fourth characterizing feature, a longer wavelength end wavelength of said detection target wavelength range corresponding to an absorption end wavelength of said light receiving area is set near a longer wavelength end wavelength of a light transmission wavelength range of said filter device and a first sensitivity for a predetermined first wavelength included within said detection target wavelength range can have a value 10,000 times or more greater than a value of a second sensitivity for a second wavelength which is outside said detection target wavelength range and which is 50 nm longer than said first wavelength. With this, the detection target light alone can be detected with even higher wavelength selectivity. As a result, it is possible to provide a photosensor capable of effectively detecting even weak light within the detection target wavelength range.

For accomplishing the above-noted object, according to the fifth characterizing feature of the photosensor having a filter function of the invention, said longer wavelength end wavelength of said detection target wavelength range is 400 nm±20 nm.

Namely, with this fifth characterizing feature, the longer wavelength end wavelength of the detection target wavelength range, that is, the absorption end wavelength of the light receiving area, is 400 nm±20 nm. Hence, it is possible to provide a photosensor capable of detecting light (including UV-B, UV-C) lower than the longer wavelength end of the ultraviolet referred to as UV-A (wavelength: 315 nm to 400 nm). Namely, it is possible to provide a photosensor for detecting UV-A, UV-B and UV-C light. Incidentally, by definition, UV-B has a wavelength range from 280 nm to 315 nm and UV-C is a light ranging its wavelength from 100 nm to 280 nm.

For accomplishing the above-noted object, according to the sixth characterizing feature of the photosensor having a filter function of the invention, said longer wavelength end wavelength of said detection target wavelength range is 365 nm±20 nm.

Namely, with this sixth characterizing feature, the longer wavelength end wavelength of the detection target wavelength range, that is, the absorption end wavelength of the light receiving area, 365 nm±20 nm. Hence, it is possible to provide a photosensor capable of detecting light near the wavelength of 365 nm included in the spectra of a flame of a low temperature boiler.

For accomplishing the above-noted object, according to the seventh characterizing feature of the photosensor having a filter function of the invention, said longer wavelength end wavelength of said detection target wavelength range is 315 nm±20 nm.

Namely, with this seventh characterizing feature, the longer wavelength end wavelength of the detection target wavelength range, that is, the absorption end wavelength of the light receiving area, 315 nm±20 nm. Hence, it is possible to provide a photosensor capable of detecting light (including UV-C) lower than the longer wavelength end of the ultraviolet referred to as UV-B (wavelength: 280 nm to 315 nm). Namely, it is possible to provide a photosensor for detecting UV-B and UV-C light.

For accomplishing the above-noted object, according to the eighth characterizing feature of the photosensor having a filter function of the invention, said longer wavelength end wavelength of said detection target wavelength range is 280 nm±20 nm.

Namely, with this eighth characterizing feature, the longer wavelength end wavelength of the detection target wavelength range, that is, the absorption end wavelength of the light receiving area, 280 nm±20 nm. Hence, it is possible to provide a photosensor capable of detecting light lower than the longer wavelength end of the ultraviolet referred to as UV-C (wavelength: 100 nm to 280 nm). Namely, it is possible to provide a photosensor for detecting UV-C light.

For accomplishing the above-noted object, according to a characterizing feature of a flame sensor relating to the present invention, the flame sensor comprises the photosensor having a filter function according to any one of the first through eighth characterizing features, the photosensor being sealed with nitrogen gas or inert gas.

Namely, with this characterizing feature, since the flame sensor is formed by sealing the photosensor having a filter function with nitrogen gas or inert gas, it is possible to provide a flame sensor having high resistance (environmental resistance) against heat, moisture, etc. Further, by combing the above-described filter device with the above-described light receiving device, there is obtained a flame sensor providing a large sensitivity difference between the sensitivity for the detection target wavelength range (the range including the flame light) and the sensitivity for the non-detection target wavelength ranges (the ranges including external disturbance light such as sunlight, room light, etc.). As a result, it is possible to provide a flame sensor capable of effectively detecting even weak light within the detection target wavelength range.

DETAILED DESCRIPTION OF THE INVENTION

A photosensor relating to the present invention will be described with reference to the accompanying drawings.

Figure 1:
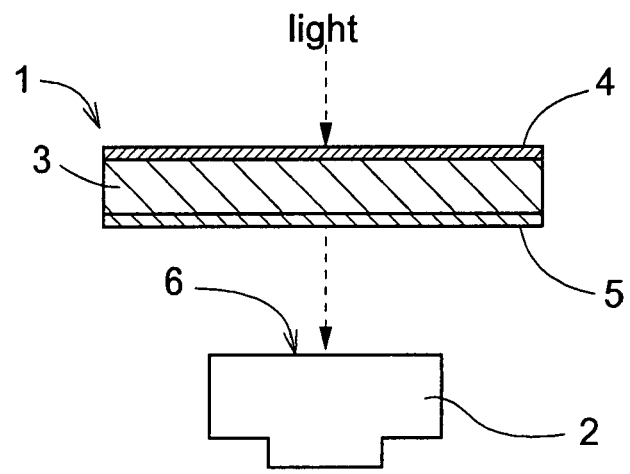
FIG. 1 shows a construction of a photosensor relating to the present invention.
Figure 2:
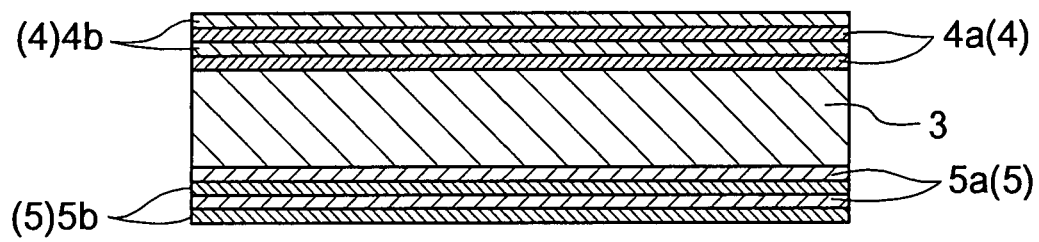
FIG. 2 shows a construction of a filter device.
Figure 3:
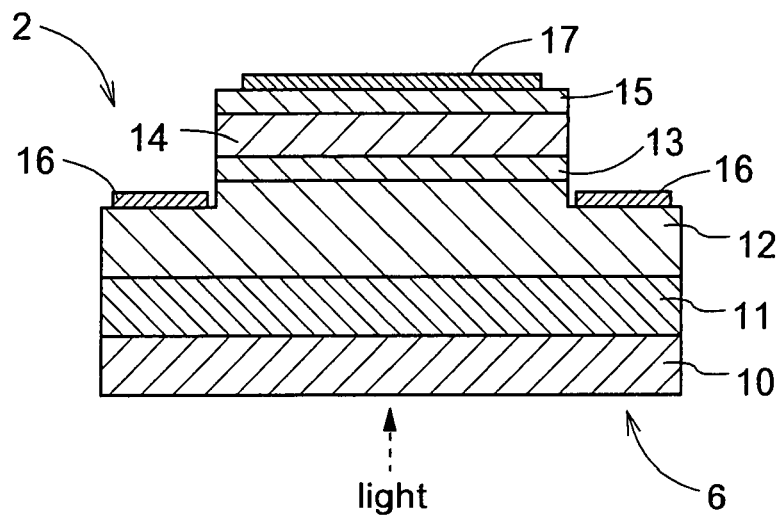
FIG. 3 shows a construction of a light receiving device.

FIGS. 1 through 3 illustrate a construction of a photosensor including a filter device 1 and a light receiving device 2. The filter device 1 comprises a colored glass filter 3 and a first interference filter structure 4 deposited on at least one face of the filter 3, the first interference filter structure 4 being comprised of a plurality of light transmitting layers 4a, 4b stacked on each other and configured to be capable of shielding light of a predetermined first wavelength range. Further, the photosensor illustrated in FIG. 1 and FIG. 2 includes also a second interference filter structure 5 deposited on the other face of the colored glass filter 3 than the one face on which the first interference filter structure 4 is deposited, the second interference filter structure 5 being comprised of a plurality of light transmitting layers 5a, 5b and configured to be capable of shielding light of a predetermined second wavelength range.

In the above-described interference filter structure 4, incident light and reflected light are caused to interfere with each other at respective interfaces of the light transmitting layer 4a and the light transmitting layer 4b, so that light of a predetermined wavelength range is canceled out. In this respect, which wavelength of light to be canceled out is set by the composition of the light transmitting layers 4a and the light transmitting layers 4b (that is, refractive index) and the layer thicknesses. Hence, by appropriately varying these factors when these layers are formed, the adjustment of the wavelength range to be canceled out can be freely effected. Incidentally, in the figures, the light transmitting layers 4a and the light transmitting layers 4b are provided two for each. However, when it is desired to obtain with this first interference filter structure 4 a sharp change in the light transmission spectrum at a desired wavelength range, it is preferred that a great number of light transmitting layers 4a and light transmitting layers 4b be deposited. Yet, it has been found that with excessive thickness of the interference filter structure, such problem as generation of cracks therein can occur. Therefore, it is preferred that its thickness range from about 1.5 μm to 3 μm. Further, the same applies to the second interference filter structure 5 as the first interference filter structure 4 described above. As incident light and reflected light are caused to interfere with each other at respective interface between the light transmitting layer 5a and the light transmitting layer 5b, light of a predetermined wavelength range will be canceled out.

The colored glass filter 3 is made so as to contain mainly boron oxide, aluminum oxide, magnesium oxide, phosphate, etc. and to contain additionally cobalt oxide, barium oxide, silica, zinc oxide, calcium oxide, nickel oxide, etc. In general, it is known that a colored glass filter can deteriorate with time under exposure to heat, moisture, etc., the deterioration inviting change in its optical characteristics. However, as illustrated in FIG. 1, by protecting the surface of the colored glass filter 3 by covering it with the above-described interference filter structures, adverse influence of heat, moisture, etc. to the colored glass filter 3 can be shielded, so that the filter device 1 can provide stable optical characteristics for an extended period of time.

The wavelength of the light (denoted with the dot line in the figure) transmitted through the above-described filter device 1 is determined by the light transmission characteristics of the colored glass filter 2, the light transmission characteristics of the first interference filter structure 4 and the light transmission characteristics of the second interference filter structure 5, which together constitute the filter device 1 and this wavelength is appropriately adjusted so as to be confined within a detection target wavelength range for the photosensor. The light receiving device 2 preferably employs such a semiconductor devices as a photodiode (PN junction type, PIN junction type, Schottky diode, etc.), a photoconductor, a phototransistor, etc. having good wavelength selectivity only for the light of detection target wavelength range. Further, in order to obtain such semiconductor device having good wavelength selectivity, preferably, in such semiconductor device, an absorption end wavelength of a light receiving area converted from a band-gap energy of the semiconductor layer forming this light receiving area should be equal to a longer wavelength end wavelength of the detection target wavelength range and also preferably, the semiconductor material forming the light receiving layer comprises a direct transition type semiconductor material represented by a general formula: $In_xAl_yGa_{1-x-y}N$ ($0 \leq x \leq 1$, $0 \leq y \leq 1$).

FIG. 3 illustrates an example wherein a PIN junction type photodiode is employed as the light receiving device 2 and an exposed face of a substrate 10 is used as the light receiving face 6 for detection of incident light. More particularly, for obtaining this PIN junction type photodiode, on the substrate 10, a buffer layer 11 capable of buffering lattice mismatch between the substrate 1 and the semiconductor layers to be deposited on this substrate 1, an n-type semiconductor layer 12, an i-type semiconductor layer 13 acting as a light receiving area, a p-type semiconductor layer 14, and a contact layer 15 are deposited one after another. Then, the contact layer 15, the p-type semiconductor layer 14, the i-type semiconductor layer 13 and the n-type semiconductor layer 12 are partially removed by means of etching so as to expose a surface of the n-type semiconductor layer 12. On this exposed surface, an electrode 16 (n-electrode) is formed and an electrode 17 (p-electrode) is formed on the surface of the contact layer 15, whereby the PIN junction photodiode is obtained.

More particularly, the substrate 10 is a sapphire substrate, the buffering layer 11 is AlN (0.3 μm~ in thickness), the n-type semiconductor layer 12 comprises a single crystal n-$Al_xGa_{1-x}N$ ($0 \leq x \leq 1$) (1 μm in thickness), the i-type semiconductor layer 13 comprises an un-doped single crystal $Al_zGa_{1-z}N$ ($0 \leq z \leq 1$) (0.1 to 0.2 μm in thickness), the p-type semiconductor layer 14 comprises a single crystal p-$Al_yGa_{1-y}N$ ($0 \leq y \leq 1$) (80 μm in thickness), and the contact layer 15 comprises p-GaN (20 nm in thickness). Also, the electrode 16 employs $ZrB_2$ as a material capable of forming an ohmic contact relative to the n-type semiconductor layer 12 and the electrode 17 employs a metal electrode such as Al, Au, Ni, etc. as a material capable of forming an ohmic contact relative to the contact layer 15.

The above-described respective semiconductor layers containing Al, Ga, N can be deposited by using a conventional MOCVD apparatus. But, growth conditions such as partial pressures of respective source gases exemplified below, carrier gas (a gas such as nitrogen, hydrogen, etc. which is inert relative to the source gases), the substrate temperature, etc. will be appropriately adjusted. The source gases for use in the deposition of the semiconductor layers can be trimethylaluminum or trietylaluminium (aluminum source), trinmethylgallium or triethylgallium (gallium source), $NH_3$ (nitrogen source). Further, if indium is to be contained, trimethylindium or triethylindium will be employed as an indium source. Also, as the n-type impurity, Si will be supplied in the form of $SiH_4$ (silane gas). As the p-type impurity, Mg will be supplied in the form of $CP_2Mg$ (cyclopentane magnesium). Further, in forming each electrode, the metal electrode of Al, Au, Ni, or the like can be formed by using the conventional vapor deposition method. $ZrB_2$ electrode can be formed by using the sputtering method.

Further, the colored glass filter 3 contains phosphate as a main component thereof and the first interference filter structure 4 was formed by alternatively stacking $SiO_2$ (light transmitting layers 4a) and $HfO_2$ (light transmitting layers 4b). In this, the layer thickness of each light transmitting layer 4a, 4b, 5a, 5b was appropriately adjusted, depending on which wavelength of light is desired to be shielded. Incidentally, the materials forming the interference filter structures (light transmitting layers 4a, 4b, 5a, 5b) are not limited to those described above. Any other various materials as long as they have light transmitting property can be employed. For instance, $TiO_2$, $Al_2O_3$, etc. can be employed as the light transmitting layers.

The membranes (light transmitting layers) formed of such material as $SiO_2$, $HfO_2$, $TiO_2$, $Al_2O_3$, etc. can be formed by the vapor deposition method such as electron beam heating, sputtering method, etc. In this, each vapor deposition source or target to be used can be a commercially available one.

Figure 4:
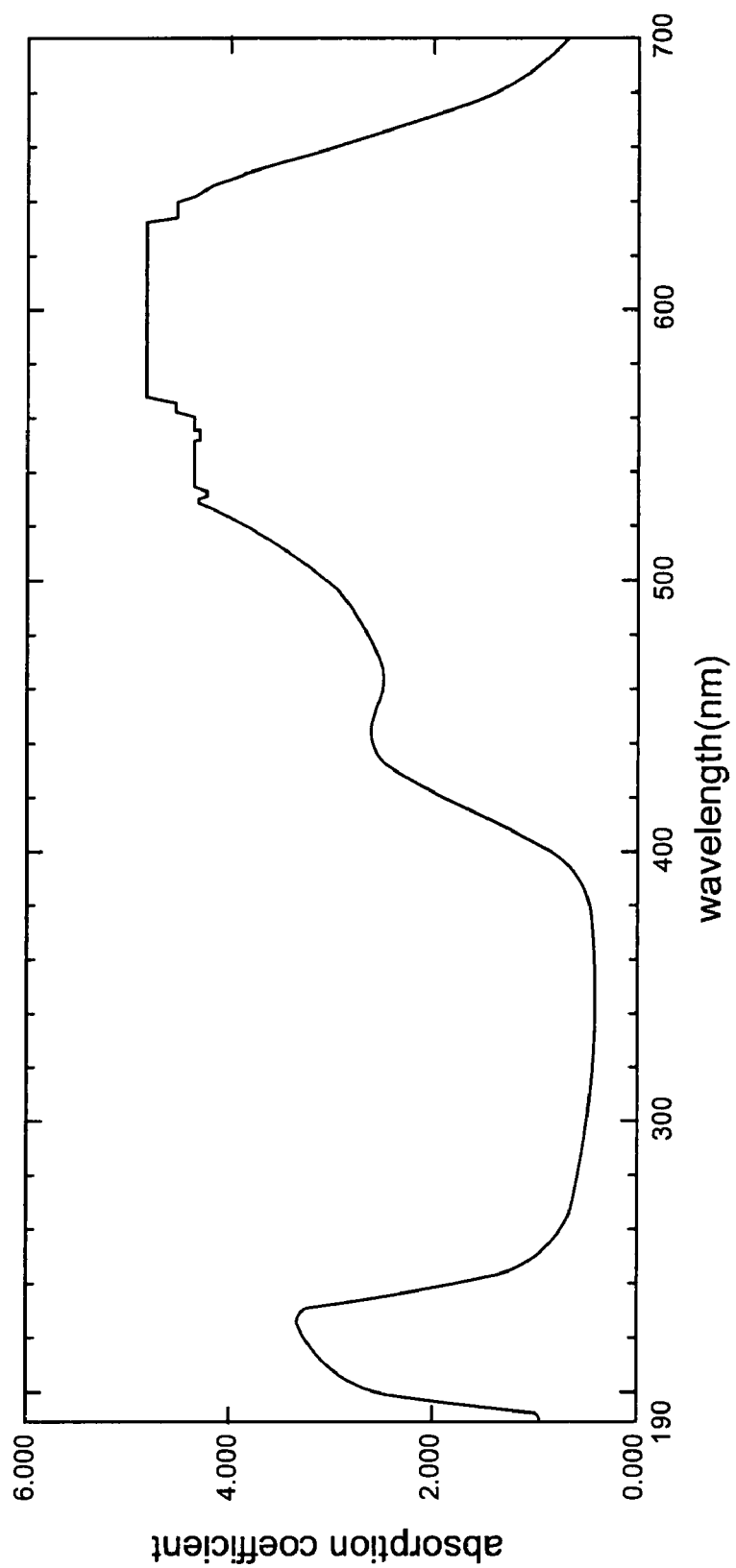
FIG. 4 is a graph showing light absorption characteristics of a colored glass filter.
Figure 5:
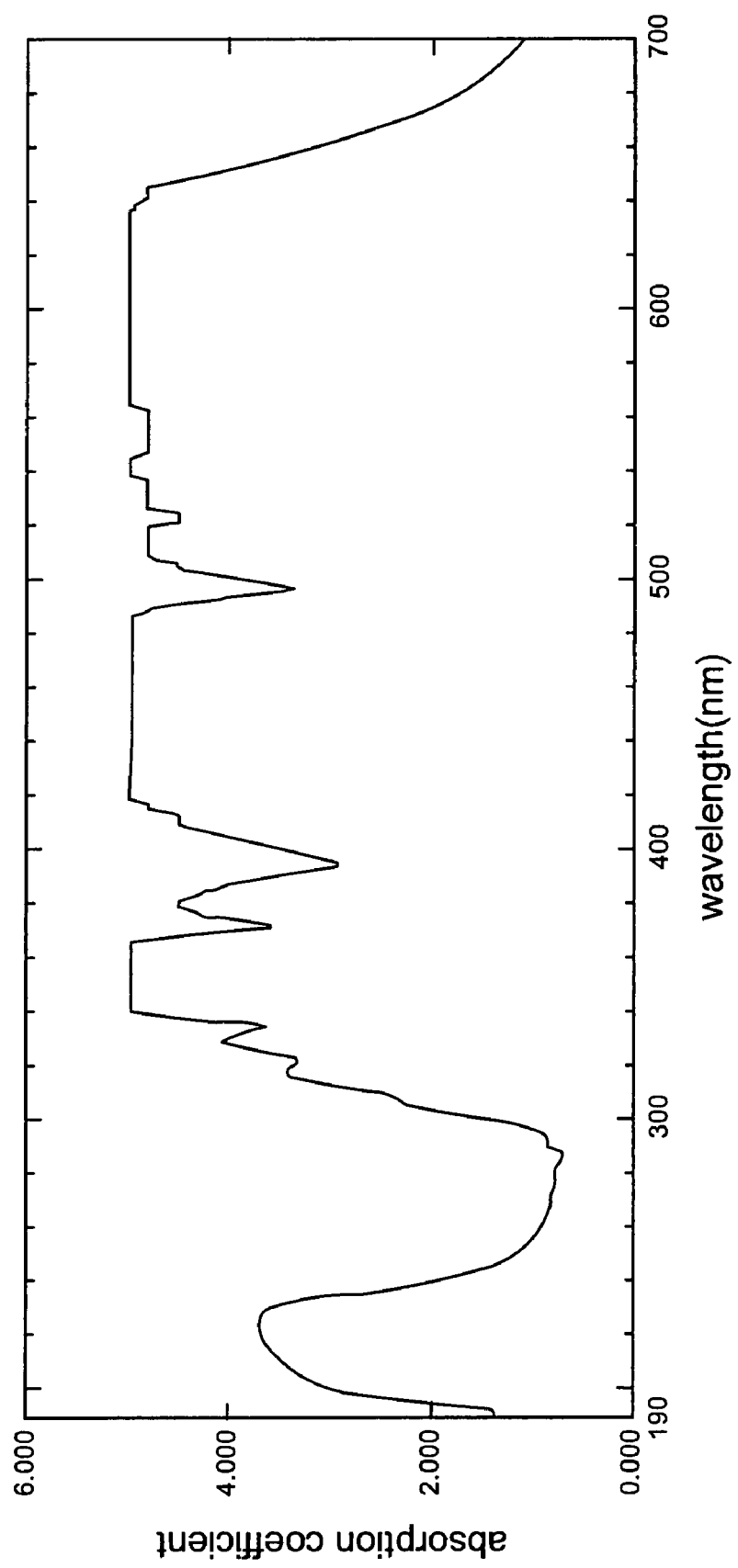
FIG. 5 is a graph showing light absorption characteristics of the filter device.

By using the filter device 1 having the colored glass filter 3, the first interference filter structure 4 and the second interference filter structure 5 described above, light can be caused to be incident on the light receiving face 6 of the light receiving device 2 while lights of wavelength ranges outside the detection target wavelength of the light receiving device 2 (photosensor) are shielded in advance. FIG. 4 and FIG. 5 respectively illustrate the light absorption characteristics of phosphate glass employed as the colored glass filter 3 (FIG. 4) and the light absorption characteristics of a filter device obtained by depositing on the surface of this colored glass filter 3, an interference filter structure having a shorter wavelength side absorption rising wavelength of 290 nm and an interference filter structure having a shorter wavelength side absorption rising wavelength of 385 nm (FIG. 5).

First, as illustrated in FIG. 4, this colored glass filter 3 allows good transmission therethrough of light having a wavelength ranging from about 260 nm to about 380 nm. Further, when on this colored glass filter 3, the first interference filter structure 4 (having the shorter wavelength absorption end wavelength of about 290 nm) and the second interference filter structure 5 (having the shorter wavelength absorption end wavelength of about 385 nm) described above are deposited, as illustrated in FIG. 5, there is obtained the filter device 1 which allows good transmission of only light of the transmission wavelength range from about 260 nm to about 300 nm and the light absorption characteristics thereof sharply changes at the longer wavelength end wavelength (about 300 nm) and the shorter wavelength end wavelength (about 260 nm) within this transmission wavelength range (namely, a filter device having good wavelength selectivity).

Therefore, from the light past the filter device 1 described above, the lights of the wavelength ranges outside the detection target of the light receiving device 2 (photosensor) have been effectively excluded already. Hence, this can minimize the possibility of erroneous detection of light of non detection target wavelength range by the light receiving device 2. Moreover, if the absorption end wavelength of the i-type semiconductor layer 13 used for forming the light receiving area is set to about 300 nm so that the longer wavelength end wavelength of the detection target wavelength range corresponding to the absorption end wavelength of the receiving area included in the light receiving device 2 may be equal to the longer wavelength end wavelength of the light transmission wavelength range of the filter device 1, then, the light outside the sensitivity wavelength range (wavelength longer than the absorption end wavelength) of the light receiving device 2 will have been shielded by the filter device 1 in advance. As a result, there can be obtained a significant difference between the sensitivity outside the detection target wavelength range of the photosensor and the sensitivity within the detection target wavelength range. Incidentally, the term "sensitivity" (unit: A/W) denotes how much photoelectric current (A) has been generated for an intensity of light (W) irradiated on the photosensor. Hence, it may be said that in the case of irradiation of light of a same intensity, the greater the photoelectric current, the higher the sensitivity.

Next, there will be described a case where the photosensor using the PIN junction type photodiode shown in FIG. 3 as the light receiving device 2 is employed as a flame sensor which is expected to detect light of a flame extending to the ultraviolet range as being distinct from external disturbance light such as sunlight or room light from various illumination equipments (that is, expected to detect light within the detection target wavelength range as being distinct from light outside the detection target wavelength range), through adjustment of a band-gap energy of the i-type semiconductor layer 13 acting as the light receiving area. Incidentally, the following discussion concerns how to set the absorption end wavelength of the light receiving area of the light receiving device 2. However, as to the transmission wavelength range of the filter device 1, this should be set by appropriately combing a colored glass filter having predetermined optical characteristics and respective interference filter structures in such a manner that the transmission wavelength range may include at least the detection target wavelength range of the photosensor and preferably the longer wavelength end wavelength of the transmission wavelength range may be equal to the absorption end wavelength of the light receiving area.

Figure 6:
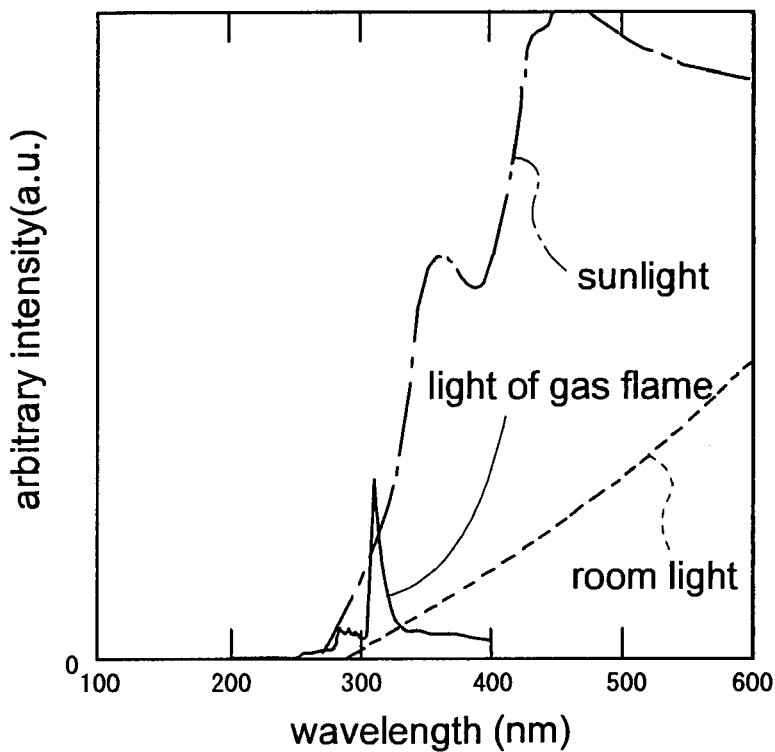
FIG. 6 is a graph showing an emission spectrum of a flame, spectrum of sunlight and spectrum of room light.

FIG. 6 shows emission spectrum of a flame generated in association with combustion of methane, spectrum of sunlight observed mainly with a wavelength of about 270 nm or more, and spectrum of room light from an illumination equipment or the like observed mainly with a wavelength of about 300 nm or more. In the emission spectrum of flame, there is observed most conspicuous peak near 310 nm due to emission of OH radicals and the end of this peak extends to the vicinity of the wavelength of about 340 nm. Further, on the shorter wavelength side, there are observed a small peak near the wavelength of about 270 nm and another small peak from the wavelength range from about 280 nm to about 300 nm. Therefore, in order to detect this emission from flame alone with good sensitivity, the light intensity of the flame contained in the light absorbed by the photodiode used in the light receiving device 2 should be as large as possible, whereas, conversely, the light intensities of the sunlight and the room light contained also in the absorbed light should be as small as possible. For instance, in order to increase the ratio of the flame light intensity contained in the absorbed light, the band-gap energy of the light receiving area should be set in the vicinity of the above-described peak wavelength and also, a light filter is attached to the light incident side of the photodiode employed as the light receiving device 2 so as to shield the sunlight, the room light or the like. Incidentally, the flame emission spectrum described above can vary, depending on the components of the combusted gas.

Figure 7:
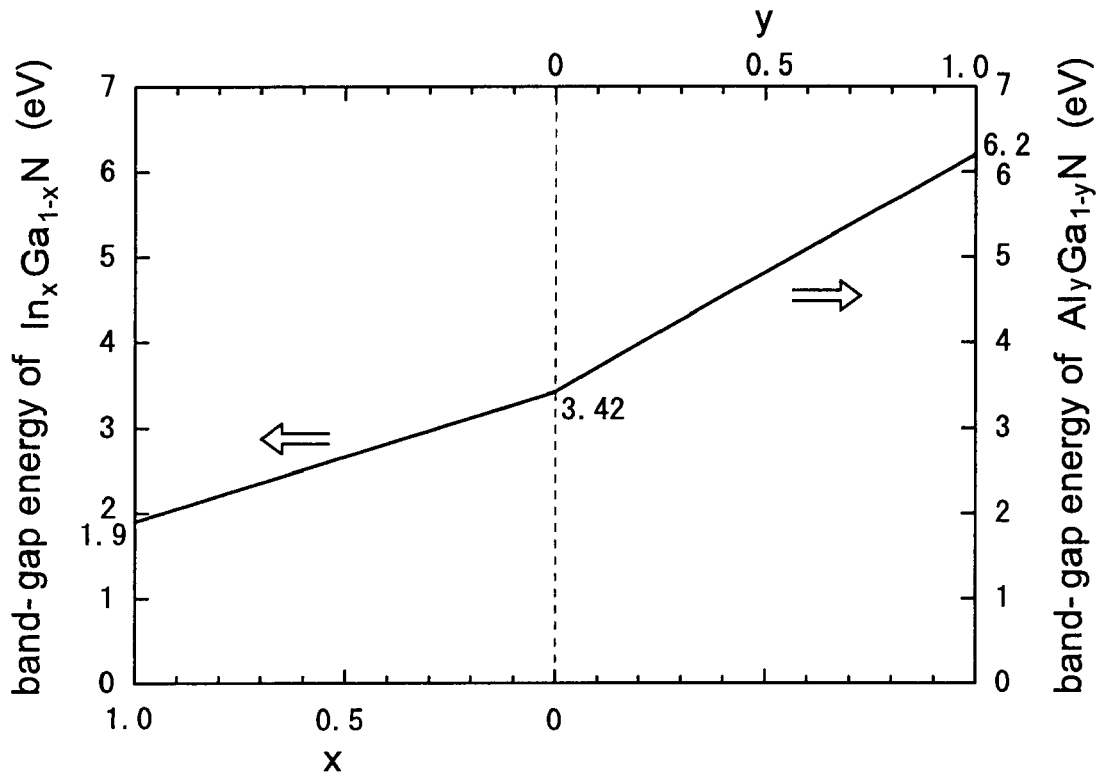
FIG. 7 shows relationship between indium composition ratio and aluminum composition ratio of InAlGaN and a band-gap energy of InAlGaN.

Next, how the band-gap energy for each semiconductor layer in the light receiving device 2 (photosensor) designed for a flame light as its detection target should be set will be described with reference to FIG. 7 which is a relationship diagram between the aluminum composition ratio in AlGaN and the band-gap energy of AlGaN. Incidentally, FIG. 7 shows a relationship between an indium composition ratio (x) and an aluminum composition ratio (y) in the semiconductor represented by a general formula: $In_xAl_yGa_{1-x-y}N$ ($0\leq x\leq 1$, $0\leq y\leq 1$) and the band-gap energy of this $In_xAl_yGa_{1-x-y}N$. In case AlGaN alone is considered, the indium composition ratio should be considered as x=0. Further, in this embodiment, the characters such as x, y, z, m, n are employed individually as the variables of the indium composition ratio and the aluminum composition ratio. For understanding the relationship among the indium composition ratio and the aluminum composition ratio and the band-gap energy, reference should be made to the graph illustrated in FIG. 7.

First, in order to set the band-gap energy of the i-type semiconductor layer 13 ($Al_zGa_{1-z}N$: $0\leq z\leq 1$) to a desired value, adjustment of its aluminum composition ratio (z) will be effected. For instance, if it is desired to manufacture a flame sensor capable of selectively receiving light of a flame within a detection target wavelength range extending below the wavelength of about 344 nm, the layer will be formed with an aluminum composition ratio z=0.05 or more so that the band-gap energy of the light receiving area (i-type semiconductor layer 13) has a band-gap energy of 3.6 eV or more, thereby to selectively absorb light having energy of 3.6 eV or more. Or, if it is desired to manufacture a flame sensor capable of receiving a flame light within a detection target wavelength range without receiving light (room light) from various illumination equipments included in the wavelength range of about 300 nm or more, the layer will be formed with an aluminum composition ratio z=0.25 or more so that the band-gap energy of the light receiving area (i-type semiconductor layer 13) has a band-gap energy of 4.1 eV or more, thereby to selectively absorb light having energy of 4.1 eV or more. Further alternatively, if it is desired to manufacture a flame sensor capable of receiving only a flame light within a detection target wavelength range without receiving light from sunlight included in the wavelength range of about 280 nm or more, the layer will be formed with an aluminum composition ratio z=0.37 or more so that the band-gap energy of the light receiving area (i-type semiconductor layer 13) has a band-gap energy of 4.4 eV or more, thereby to selectively absorb light having energy of 4.4 eV or more.

Or, in case absorption of an external disturbance light such as sunlight by the light receiving area is permissible as long as such light has a low intensity, then, the layer will be formed with an aluminum composition ratio z=0.31 or more so that the band-gap energy of the light receiving area (i-type semiconductor layer 13) has a band-gap energy of 4.3 eV or more (wavelength of about 290 nm or less), thereby to selectively absorb light having energy of 4.3 eV or more. At the wavelength of about 290 nm or less, the intensities of such external disturbance lights are very low as illustrated in FIG. 6 whereas the intensity of the flame light is very high, so that presence of the flame light can be detected.

Further, in case the photodiode (light receiving device 2) constituting the flame sensor is installed within a closed space such as within a water heater or within an engine for detecting emission of a flame therein, as no room light or sunlight is present therein, there is no need to consider the presence thereof. For this reason, when it is desired to manufacture a photodiode capable of selectively receiving light of an emission peak (wavelength: about 310 nm (310 nm±10 nm): 4.0 eV) due to emission of OH radicals observed in combustion of a hydrocarbon-containing compound (methane contained in city gas, fuel combusted in an engine) among those flame lights within the detection target wavelength range, the layer may be formed with an aluminum composition ratio z=0.23 so that the band-gap energy of the light receiving area has a band-gap energy of 4.0 eV or more, thereby to selectively absorb light having energy of 4.0 eV or more.

In the case of use at a place such as a low-temperature boiler where the amount of emission noise is very small, the cutoff wavelength of the light receiving area may sometimes be set near the band-gap energy of GaN, although the detection target is light having wavelength of 314 nm in the UV-B region. In this case, the band-gap energy of the light receiving area should be set to 3.4 eV, so as to allow the light receiving area to selectively absorb light having energy of about 3.4 eV or more.

Further, in addition to the above-described adjustment of the band-gap energy of the light receiving area, further arrangement is made so that the band-gap energy of the semiconductor layer disposed on the light incident side (on the side of the substrate 10 in this embodiment) of the light receiving area may be greater than the band-gap energy of the light receiving area, thereby to allow the layer to act as a light selective layer for selectively allows transmission of a desired wavelength range. In other words, by adopting a "hetero" structure in which the band-gap energy of the n-type semiconductor layer (n-$Al_xGa_{1-x}N$) 12 is set to be greater than the band-gap energy of the i-type semiconductor layer ($Al_zGa_{1-z}N$) 13, it is possible to design such that the light of the wavelength range to be absorbed by the i-type semiconductor layer 13 may not be lost due to e.g. its absorption by the n-type semiconductor layer 12 or the light diffusion. In this case, the relationship of the aluminum composition ratios x, z is expressed as x>z.

For instance, in the case of setting the aluminum composition ratio x=0.3 for the n-type semiconductor layer (n-$Al_xGa_{1-x}N$) 12, the light having the wavelength of about 290 nm or more can be effectively transmitted to the i-type semiconductor layer 13. Further, the n-type semiconductor layer 12 absorbs lights having wavelengths shorter than 290 nm. Hence, in case the aluminum composition ratio is set as z=0.2 for the i-type ($Al_zGa_{1-z}N$) in order to absorb light having a wavelength shorter than about 290 nm, there will be obtained a photodiode (light receiving device 2) capable of selectively absorbing light having a wavelength from about 290 to about 310 nm by the i-type semiconductor layer 13.

Figure 8:
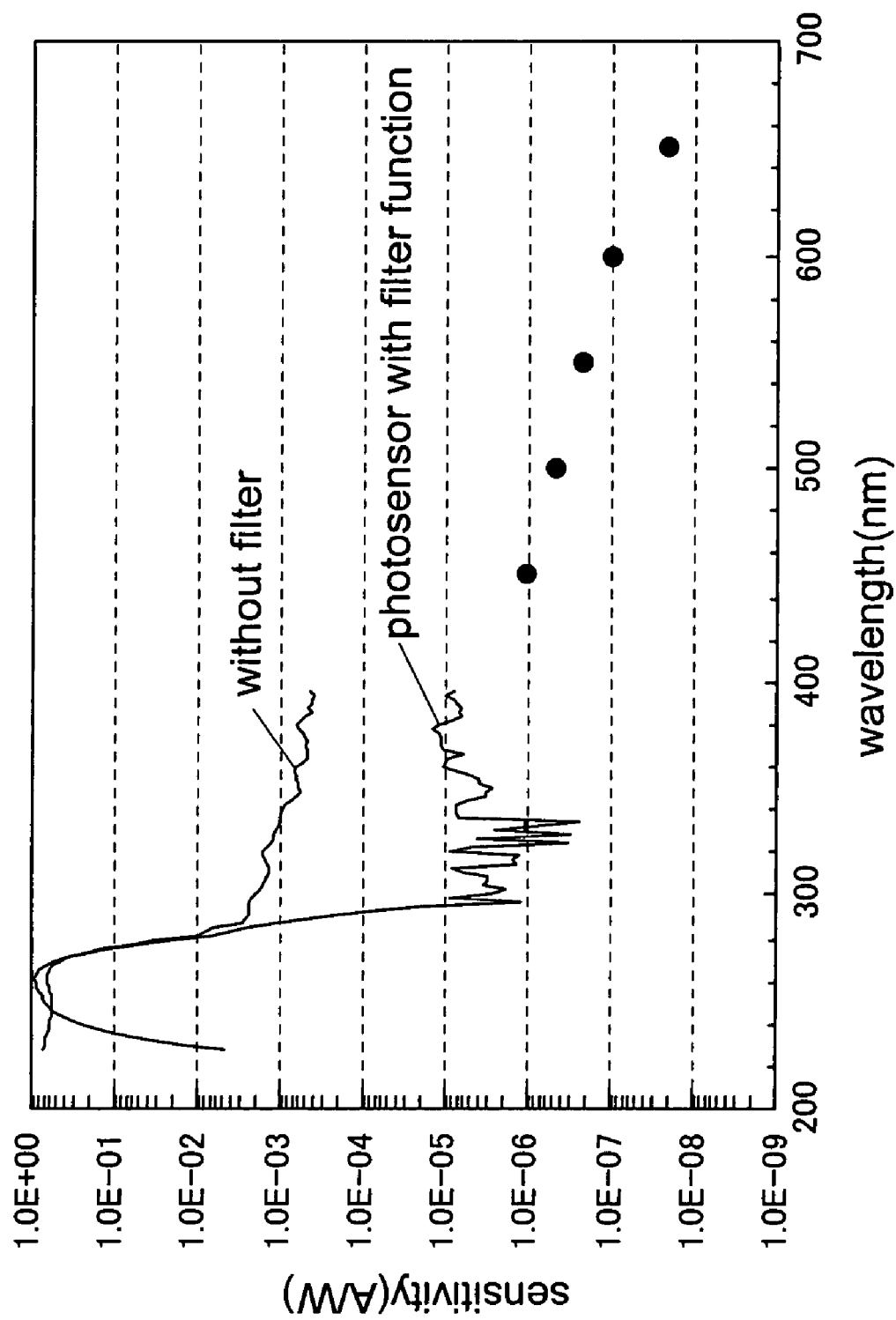
FIG. 8 is a graph showing sensitivity characteristics of a photosensor.

FIG. 8 is a graph of sensitivity characteristics of a photosensor constructed as follows. Namely, like the case described above with reference to FIG. 5, on two faces of a phosphate glass having optical characteristics shown in FIG. 4, an interference filter structure having a shorter wavelength side absorption rising wavelength of 290 nm and a further interference filter structure having a shorter wavelength side absorption rising wavelength of 340 nm are deposited, thereby to obtain a filter device 1. And, this filter device 1 is combined with a photodiode (light receiving device 2) having the structure shown in FIG. 3 and provided with setting a band-gap energy of its i-type semiconductor 13 acting as a light receiving area to 4.4 eV In this case, the value of first sensitivity for the wavelength of 270 nm within the detection target wavelength range can be set as high as 10,000 times or more higher than the value of the second sensitivity for a longer wavelength (320 nm) which is outside the detection target wavelength range and is 50 nm longer than the first wavelength (270 nm). That is to say, because of its high wavelength selectivity for the detection target light alone, this photosensor can effectively detect presence of a light within the detection target wavelength range even when this light is weak. Incidentally, as a comparison example, there is also shown a graph of sensitivity of a photosensor not having the filter device 1. It may be understood that this sensor cannot ensure sufficient difference between its sensitivity for the first wavelength and its sensitivity for the second wavelength.

Further, since sufficient difference is ensured between the first sensitive for the first wavelength and the sensitivity for any wavelength in the visible range longer than the second wavelength, the above-described photosensor can detect the detection target light alone with high wavelength selectivity and can effectively detect such light within the detection target wavelength range even when this light is very weak.

Moreover, by adjusting the band-gap energy of the semiconductor layer used for the formation of the light receiving area and the band-gap energy of the semiconductor layer (light selective layer) disposed on the light incident side relative thereto, there can be produced a photosensor capable of selectively detecting light of a predetermined detection target wavelength range. In doing this, a colored glass filter having predetermined optical characteristics and respective interferences filter structures will be combined appropriately such that the longer wavelength end wavelength of the transmission wavelength range of the filter device 1 may be equal to the absorption end wavelength of the light receiving area and also that the shorter wavelength end wavelength of the transmission wavelength range may be equal to the absorption end wavelength of the light selective layer. Some application examples of such photosensor include a device for determining intensity of ultraviolet light present within each detection target wavelength range such as UV-A (wavelength: 315 nm to 400 nm), UV-B (wavelength: 280 nm to 315 nm), UV-C (wavelength: 280 nm to 100 nm), or the like. And, these devices can be employed as flame sensors as well.

Next, there will be described examples in which in the PIN type photodiode (light receiving device 2) having the construction illustrated in FIG. 3, the n-type semiconductor layer 12 acting as a light selective layer and the i-type semiconductor layer 13 acting as a light receiving area comprise $In_xAl_yGa_{1-x-y}N$ ($0 \leq x \leq 1$, $0 \leq y \leq 1$). In these cases, in the n-type semiconductor layer 12 and the i-type semiconductor layer 13, the values of the indium composition ratio (x) and the aluminum composition ratio (y) are adjusted respectively, whereby the band-gap energies of $In_xAl_yGa_{1-x-y}N$ ($0 \leq x \leq 1$, $0 \leq y \leq 1$) constituting the n-type semiconductor layer 12 and the i-type semiconductor layer 13 are obtained as illustrated in FIG. 7. Further, the filter device 1 is constructed by using a predetermined colored glass filter and interference filter structures such that its transmission wavelength range may be equal to the detection target wavelength range for each of following cases.

First, in the case of manufacturing a photosensor for detecting all the lights of UV-A, UV-B and UV-C, the detection target wavelength range is from 100 nm to 400 nm. Therefore, the band-gap energy of the i-type semiconductor layer 13 acting as the light receiving area may be adjusted to about 3.1 eV which corresponds to the longer wavelength end wavelength (400 nm) of this detection target wavelength range. Also, it is required to maximize the band-gap energy of the n-type semiconductor layer 12 acting as the light selective layer so as to approach the band-gap energy corresponding to the shorter wavelength end wavelength (100 nm) of the detection target wavelength range. Hence, the i-type semiconductor layer 13 may be $In_{0.21}Ga_{0.79}N$ and the n-type semiconductor may be AlN, respectively.

In the case of manufacturing a photosensor for detecting the lights of UV-B and UV-C, the detection target wavelength range is from 100 nm to 315 nm. Therefore, the band-gap energy of the i-type semiconductor layer 13 acting as the light receiving area may be adjusted to about 3.9 eV which corresponds to the longer wavelength end wavelength (315 nm) of this detection target wavelength range. Also, it is required to maximize the band-gap energy of the n-type semiconductor layer 12 acting as the light selective layer so as to approach the band-gap energy corresponding to the shorter wavelength end wavelength (100 nm) of the detection target wavelength range. Hence, the i-type semiconductor layer 13 may be $Al_{0.17}Ga_{0.83}N$ and the n-type semiconductor may be AlN, respectively.

In the case of manufacturing a photosensor for detecting the light of UV-C, the detection target wavelength range is from 100 nm to 280 nm. Therefore, the band-gap energy of the i-type semiconductor layer 13 acting as the light receiving area may be adjusted to about 4.4 eV which corresponds to the longer wavelength end wavelength (280 nm) of this detection target wavelength range. Also, it is required to maximize the band-gap energy of the n-type semiconductor layer 12 acting as the light selective layer so as to approach the band-gap energy corresponding to the shorter wavelength end wavelength (100 nm) of the detection target wavelength range. Hence, the i-type semiconductor layer 13 may be $Al_{0.35}Ga_{0.65}N$ and the n-type semiconductor may be AlN, respectively.

In the case of manufacturing a photosensor for detecting the light of UV-A, the detection target wavelength range is from 315 nm to 400 nm. Therefore, the band-gap energy of the n-type semiconductor layer 12 acting as the light selective layer may be adjusted to about 4.4 eV which corresponds to the shorter wavelength end wavelength (315 nm) of this detection target wavelength range and the band-gap energy of the i-type semiconductor layer 13 acting as the light receiving area may be adjusted to about 3.1 eV which corresponds to the longer wavelength end wavelength (400 nm) of this detection target wavelength range. Hence, the i-type semiconductor layer 13 may be $In_{0.21}Ga_{0.79}N$ and the n-type semiconductor may be $Al_{0.17}Ga_{0.83}N$, respectively.

In the case of manufacturing a photosensor for detecting the lights of UV-A and UV-B, the detection target wavelength range is from 280 nm to 400 nm. Therefore, the band-gap energy of the n-type semiconductor layer 12 acting as the light selective layer may be adjusted to about 4.4 eV which corresponds to the shorter wavelength end wavelength (280 nm) of this detection target wavelength range and the band-gap energy of the i-type semiconductor layer 13 acting as the light receiving area may be adjusted to about 3.1 eV which corresponds to the longer wavelength end wavelength (400 nm) of this detection target wavelength range. Hence, the i-type semiconductor layer 13 may be $In_{0.21}Ga_{0.79}N$ and the n-type semiconductor may be $Al_{0.35}Ga_{0.65}N$, respectively.

In the case of manufacturing a photosensor for detecting the light of UV-B, the detection target wavelength range is from 280 nm to 315 nm. Therefore, the band-gap energy of the n-type semiconductor layer 12 acting as the light selective layer may be adjusted to about 4.4 eV which corresponds to the shorter wavelength end wavelength (280 nm) of this detection target wavelength range and the band-gap energy of the i-type semiconductor layer 13 acting as the light receiving area may be adjusted to about 3.9 eV which corresponds to the longer wavelength end wavelength (315 nm) of this detection target wavelength range. Hence, the i-type semiconductor layer 13 may be $Al_{0.17}Ga_{0.83}N$ and the n-type semiconductor may be $Al_{0.35}Ga_{0.65}N$, respectively.

Figure 9:
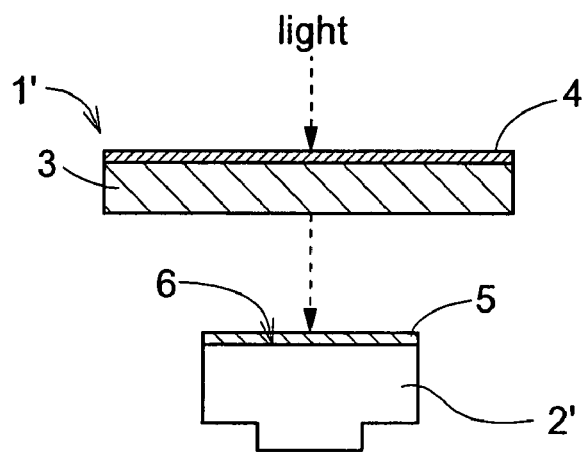
FIG. 9 shows another construction of a photosensor relating to the present invention.

FIG. 9 shows a modification of the photosensor illustrated in FIG. 1. In this construction, the second interference filter structure 5 is deposited on a light receiving face 6 of a light receiving device 2'. For instance, in case the light receiving device 2' is the photodiode shown in FIG. 3, the second interference filter structure 5 will be deposited on the sapphire substrate 10 acting as the light receiving face 6. In this case too, only the light transmitted through the colored glass filter 3, the first interference filter structure 4 and the second interference filter structure 5 will be incident on the light receiving face 6 of the light receiving device 2, so that the lights of predetermined wavelength ranges will be shielded respectively by these filters. Moreover, since the first interference filter structure 4 is deposited on the colored glass filter 3, the surface of the colored glass filter is protected against heat, moisture, etc. Hence, there is provided a photosensor having high resistance against heat and moisture.

As described above, the disposing positions of the first interference filter structure 4 and the second interference filter structure 5 are not particularly limited as long as they are on the light receiving face 6 side of the light receiving device. Though not shown, the second interference filter structure 5 may be deposited on the first interference filter structure 4.

Figure 10:
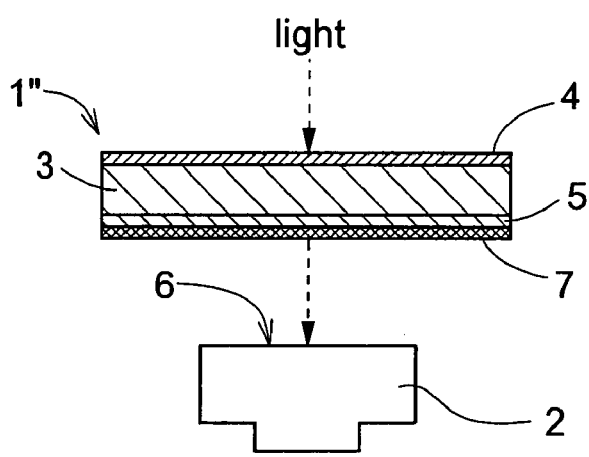
FIG. 10 shows still another construction of a photosensor relating to the present invention.

FIG. 10 shows an example in which on the second interference filter structure 5 shown in FIG. 1, a third interference filter structure 7 different from the first interference filter structure 4 and the second interference filter structure 5 is provided.

As shown, as the first interference filter structure 4, the second interference filter structure 5 and the third interference filter structure 7 are formed on the light receiving face 6 side of the light receiving device 2, it is possible to effectively shield external disturbance light such as sunlight or room light from various illumination equipments over an even wider wavelength range. Further, since the surface of the colored glass filter can be thickly protected by the interference filter structures, it is possible to provide a photosensor having higher resistance against heat and moisture (environmental resistance). Incidentally, the disposing position of the third interference filter structure 7 is not limited to the one shown in FIG. 10. As long as it is on the light receiving face 6 side of the light receiving device, its can be deposited on the colored glass filter 3, the first interference filter structure 4, the second interference filter structure 5 or on the light receiving face 6 of the light receiving device, etc. However, in case the third interference filter structure 7 is to be deposited on the first interference filter structure 4 or on the second interference filter structure 5, it will be needed to take some measure for avoiding the problem of e.g. cracks by limiting the total membrane thickness of the interference filter structures to 1.5 µm to 3 µm or less.

Figure 11:
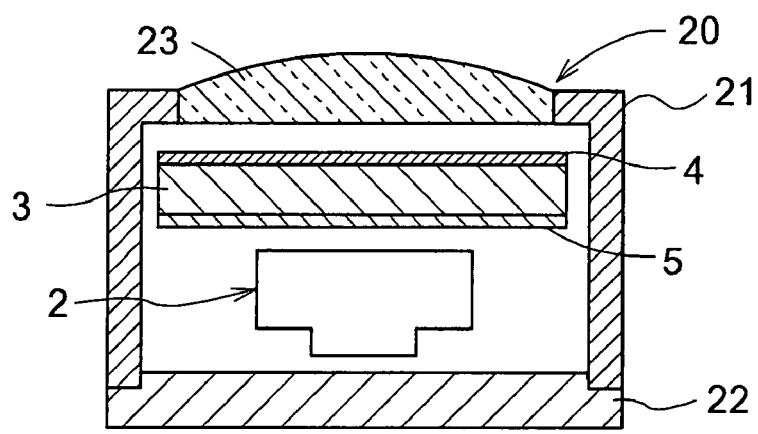
FIG. 11 shows still another construction of a photosensor relating to the present invention.

Further, when providing the first interference filter structure 4, the second interference filter structure 5 and the third interference filter structure 7, instead of stacking these three interference filter structures on a same member (on the filter device or on the light receiving device), there is adopted a construction in which at least one of these interference filter structures is provided on a different member. It has been newly found that in stacking interference filter structures, excessive total membrane thickness thereof (membrane thickness of 1.5 µm to 3 µm), such problem of cracking will occur, this rendering the sensor unusable as an optical component. In this regard, by adopting the above construction in which at least one of these interference filter structures is provided on a different member, as described above, it is possible to divide the total membrane thickness of the interference filter structures between on two surfaces. Hence, the possibility of occurrence of the cracking problem in the interference filter structure can be eliminated FIG. 11 shows a construction of a flame sensor formed by sealing the invention's photosensor having a filter function with nitrogen gas or inert gas.

The flame sensor 20 is constructed such that a filter device 1 (1', 1") and a light receiving device 2 (2') are housed within a space formed by a housing 21, a substrate 22 and a lens 23 and the inside of this space is sealed with nitrogen gas or inert gas such as argon gas. Therefore, as the filter device and the light receiving device are kept within the nitrogen gas atmosphere or the inert gas atmosphere, the problem of performance deterioration of the colored glass filter due to moisture can be minimized. Also, the problem of performance deterioration of the colored glass filter due to heat from the surrounding of the flame sensor 20 and the problem of performance deterioration of the light receiving device can be minimized also.

It is possible to provide a photosensor or a flame sensor having a filter device capable of maintaining stable optical characteristics for an extended period of time.

The invention claimed is:

1. A photosensor having a filter function, comprising:
    a filter device having a colored glass filter and configured for permitting transmission of light of a predetermined wavelength range including a detection target wavelength range; and
    a light receiving device for receiving the light transmitted through the filter device;
    wherein said filter device includes a first interference filter structure comprised of a plurality of light transmitting layers stacked on each other, the first interference filter structure being deposited on a face of the colored glass filter;
    said light receiving device includes a semiconductor photodetector structure having one or more semiconductor layers, a light receiving area being formed in the one or more semiconductor layers within the semiconductor photodetector structure; and
    said one or more semiconductor layers forming the semiconductor photodetector structure contain $In_xAl_yGa_{1-x-y}N$ ($0 \leq x \leq 0.21$, $0 \leq y \leq 1$).

2. The photosensor having a filter function according to claim 1, wherein said filter device further includes a second interference filter structure comprised of a plurality of light transmitting layers stacked on each other, the second interference filter structure being deposited on another face of the colored glass filter opposite to the one face on which said first interference structure is deposited.

3. The photosensor having a filter function according to claim 1, wherein said interference filter structure contains at least one of $SiO_2$ and $HfO_2$, with an exposed surface of the interference filter structure being formed of the oxide.

4. The photosensor having a filter function according to claim 1, wherein a longer wavelength end wavelength of said detection target wavelength range corresponding to an absorption end wavelength of said light receiving area is set near a longer wavelength end wavelength of a light transmission wavelength range of said filter device; and
    a first sensitivity for a predetermined first wavelength included within said detection target wavelength range has a value 10,000 times or more greater than a value of a second sensitivity for a second wavelength which is outside said detection target wavelength range and which is 50 nm longer than said first wavelength.

5. The photosensor having a filter function according to claim 4, wherein said longer wavelength end wavelength of said detection target wavelength range is 400 nm±20 nm.

6. The photosensor having a filter function according to claim 4, wherein said longer wavelength end wavelength of said detection target wavelength range is 365 nm±20 nm.

7. The photosensor having a filter function according to claim 4, wherein said longer wavelength end wavelength of said detection target wavelength range is 315 nm±20 nm.

8. The photosensor having a filter function according to claim 4, wherein said longer wavelength end wavelength of said detection target wavelength range is 280 nm±20 nm.

9. A flame sensor comprising the photosensor having a filter function according to claim 1, the photosensor being sealed with nitrogen gas or inert gas.

10. A flame sensor comprising the photosensor having a filter function according to claim 2, the photosensor being sealed with nitrogen gas or inert gas.

11. A flame sensor comprising the photosensor having a filter function according to claim 3, the photosensor being sealed with nitrogen gas or inert gas.

12. A flame sensor comprising the photosensor having a filter function according to claim 4, the photosensor being sealed with nitrogen gas or inert gas.

13. A flame sensor comprising the photosensor having a filter function according to claim 5, the photosensor being sealed with nitrogen gas or inert gas.

14. A flame sensor comprising the photosensor having a filter function according to claim 6, the photosensor being sealed with nitrogen gas or inert gas.

15. A flame sensor comprising the photosensor having a filter function according to claim 7, the photosensor being sealed with nitrogen gas or inert gas.

16. A flame sensor comprising the photosensor having a filter function according to claim 8, the photosensor being sealed with nitrogen gas or inert gas.

* * * * *